Jan. 24, 1956  R. E. WURSTER  2,731,896
MULTIPLE PURPOSE RAKE
Filed Dec. 18, 1950
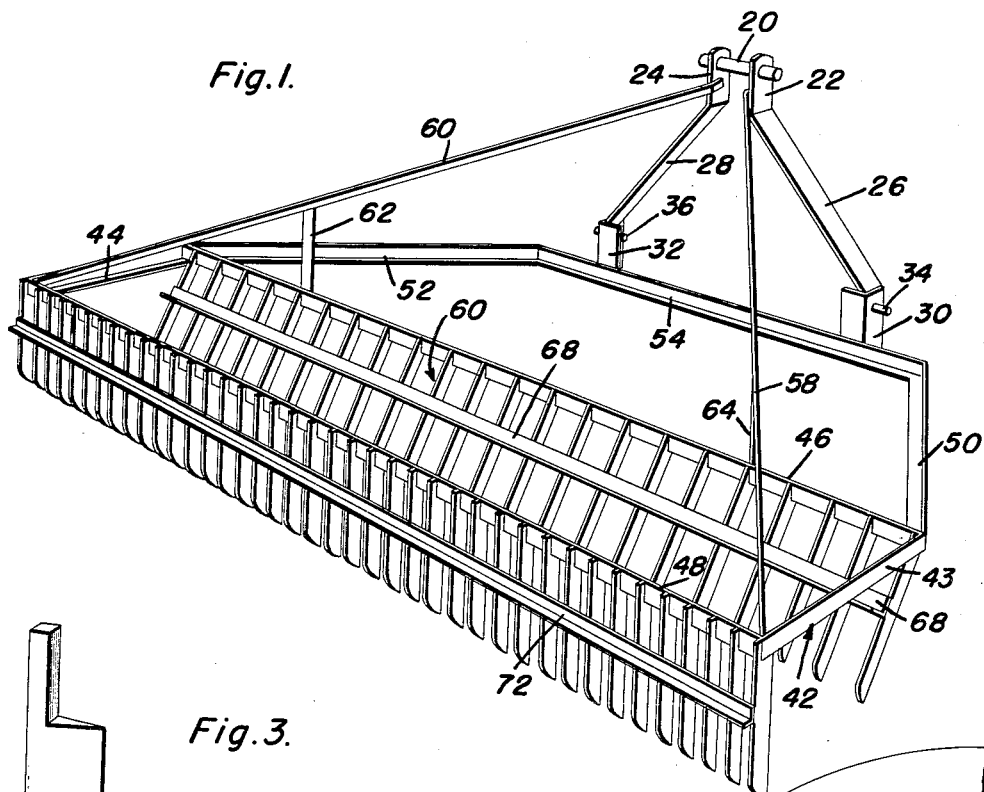
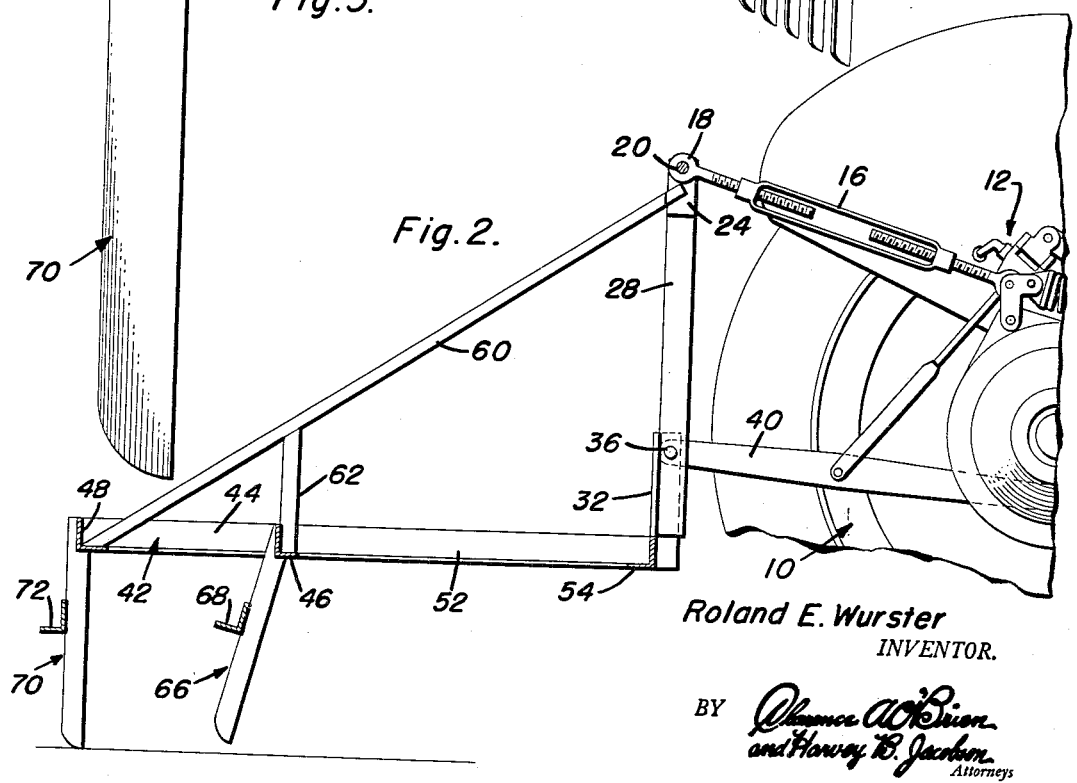
Roland E. Wurster
INVENTOR.

United States Patent Office 2,731,896
Patented Jan. 24, 1956

2,731,896

MULTIPLE PURPOSE RAKE

Roland E. Wurster, Ypsilanti, Mich.

Application December 18, 1950, Serial No. 201,310

5 Claims. (Cl. 97—47.2)

This invention relates to improvements in farm implements.

An object of this invention is to provide an improved rake which is so constructed that a front row of tines are set at an angle to produce a pulverizing effect when the rake is in operation and are vertically elevated with respect to the rear row of tines so that very small articles of trash or particles may escape beneath them, together with substantially vertical tines of said rear row which are spaced closer than the tines of the front row so as to act as a leveling tool when employing the rake.

Ancillary objects and features of importance will become apparent in following the description of the illustrated form of the invention.

In the drawings:

Figure 1 is a perspective view of the rake which is arranged to be attached to the back of a tractor;

Figure 2 is a sectional view of the attachment showing it connected with a fragmentary part of a standard tractor; and, Figure 3 is a perspective view of one of the tines of the rear row.

As I have illustrated in the drawings, there is a fragmentary part of a standard tractor 10 with a conventional hydraulic mechanism 12 near the rear end thereof having the extensible link 16 operatively connected therewith. Other types of standard tractors, as the garden variety, may be used in lieu of the tractor supplied with the hydraulic mechanism 12. This is left within the prerogative of the owner of the device.

The extensible link 16 is a turnbuckle having an eye 18 at one end mounted on a pivot pin or spindle 20. This spindle is located in vertical brackets 22 and 24 which are formed at the upper ends of the converging supports 26 and 28.

The supports have their lower ends in contact with parallel flanges of the angle support members 30 and 32 whereby the pins 34 and 36 may be passed through suitable openings in the supports and support members thereby releasably connecting the supports 26 and 28 to the support members 30 and 32. The pins 34 and 36 are arranged to pass through apertures in the draw bar arms 40 of the tractor 10 so that the rake may be coupled to the tractor for operation. The word "standards" is intended to refer to the parts 30, 26 and 22 which rise upwardly as a yoke from the rear of a frame 42.

The rake structure includes a substantially rectangular base or frame 42 having ends 43 and 44 together with sides 46 and 48, each of these elements being made preferably of angle stock.

Rearwardly converging brace bars 50 and 52 extend from opposite corners of the rectangular frame 42 and a cross member 54, on which the standards are fastened, joins the inner ends thereof. The cross member 52 has the support members 30 and 32 fixed thereto by standard means, as by welding.

For rigidity and strength of construction braces 58 and 60 are welded or otherwise rigidly fixed to the brackets 22 and 24 and also to the frame 42 at the corners opposite from the corners to which the brace bars 50 and 52 are attached. Vertical posts 62 and 64 are welded or otherwise securely fixed to the brace bars 60 and 58 and also to the side 46 of the frame 42.

There is a front row 66 of tines spaced from each other and having their longitudinal axes at a slight angle with respect to a vertical plane. A brace 68, preferably of angle construction, is welded intermediate the upper and lower ends of the tines to couple the tines together. The upper ends of the tines are fixed by standard means to the side 46 of the frame and these tines are sharpened slightly.

There is a rear row of tines 70 welded or otherwise fixed by standard means to the side 48 of the frame 42. The row of tines 70 is arranged in a vertical plane and the tines project slightly lower than the row of tines 66. A brace or support 72 is rigidly fixed to the tines of the front row 70 intermediate the upper and lower ends thereof for strength of construction. This brace 72 extending rearwardly as it does from the plane of the tines aids also in an earth-moving operation when the device is moved rearwardly in a bull-dozing effect.

In use of the device after it has been set to the desired height by operation of the extensible link, the front row of tines 66 produce a pulverizing effect and since they are spread apart they pick up the larger particles of trash. They are a little shorter than the row 70 of tines to allow the finer particles to escape beneath them.

The rear or following row of tines 70 are set vertically to act as a leveling tool and do a finer job of raking. These tines are fairly sharp to allow depth in working of moist soil and are closer together than the tines in the row 66. By applying pressure by the standard means 12 or the link 16, considerable soil may be moved. Moreover, the rake so constructed, is sufficiently strong to allow it to be backed into piles of soil for spreading.

Having described the invention, what is claimed as new is:

1. A rake comprising a substantially rectangular frame having ends and sides, means fixed to said frame for attachment to a tractor, a front row of tines secured to one of said sides and angularly downwardly depending from said frame to produce a pulverizing effect, a rear row of tines secured to the other of said sides and vertically, downwardly depending from said frame to produce a relatively fine raking effect, said attachment means including a cross bar secured to one of said sides, said cross bar being parallel to and spaced horizontally from said one side, a pair of spaced standards mounted on said cross bar, pivot pins secured to said standards and adapted to be journaled in draw bar arms, and an adjustable link pivotally secured to said standards whereby said frame may be angularly adjusted about the pivot pins by means of the link to selectively engage said front and rear tines.

2. A rake comprising a substantially rectangular frame including front and rear side members connected by a pair of end members, a yoke attached to said front side member and including a cross member extending parallel to said side members, vertical support members mounted at spaced points along said cross member, pivot pins secured to said support members for swingably suspending the frame from a lift assembly, brackets on said support members converging toward one another and connected at their upper ends, a turnbuckle pivotally connected to the upper end of said brackets and adapted to be connected to a lift assembly for swinging the frame about the pivot pins, a front row of spaced apart tines secured to and depending from said front side and a rear row of tines secured to and depending from said rear side, said rear row of tines being spaced apart less than said front row of tines to produce a fine raking effect, swinging of said frame selectively placing the front and rear rows of tines in ground engaging position, and brace means extending across each set of tines intermediate the ends thereof for rigidifying the same.

3. An earth moving and working tool which comprises a mounting frame to be spaced from the ground comprising a series of joined members lying in a plane and enclosing a substantial area, said plane being adapted to be positioned substantially horizontally, a forward yoke member rising vertically from said frame, stabilizing members from the top portion of said yoke member extending to the rear portion of said frame, fastening means to associate said frame with a power device such as a tractor comprising arms extending to said tractor from three or more spaced points on said yoke member, said points being spaced horizontally and vertically and said arms extending to said power means at points spaced vertically, and a double set of tines fastened in fore and aft spaced relation to said frame extending downwardly from said frame to the ground, said forward tines being arranged at a positive rake angle with respect to the ground when said main frame member is horizontally disposed, said rear set of tines being relatively closely spaced together and having a relatively neutral rake angle with respect to the ground when said frame is horizontally positioned, said teeth having a triangular cross section with the apex at the forward edge and a base at the rear edge and having a relieved surface from the forward contact point to the rear edge to permit said rear set of tines to be readily moved rearwardly thereby to move quantities of earth with a bull-dozing action and to permit in forward movement a chopping action by the forward teeth and a smoothing and leveling action by the rearward teeth.

4. An earth moving and working tool which comprises a mounting frame to be spaced from the ground comprising a series of joined members lying in a plane and enclosing a substantial area, said plane being adapted to be positioned substantially horizontally, a forward yoke member rising vertically from said frame, fastening means to associate said frame with a power device such as a tractor, and a double set of tines fastened in fore and aft spaced relation to said frame extending downwardly from said frame to the ground, said forward tines being arranged at a positive rake angle with respect to the ground when said main frame member is horizontally disposed, said rear set of tines being relatively closely spaced together and having a relatively neutral rake angle with respect to the ground when said frame is horizontally positioned to permit said rear set of tines to be readily moved rearwardly thereby to move quantities of earth with a bull-dozing action and to permit in forward movement a chopping action by the forward teeth and a smoothing and leveling action by the rearward teeth.

5. A device as defined in claim 4 in which said frame and said fastening means are shiftable to create a greater positive rake angle on said forward tines while lifting said rearward tines out of contact with the ground and selectively to create a negative rake angle on said rearward tines with respect to the ground while removing said forward tines from said contact with the ground.

References Cited in the file of this patent

UNITED STATES PATENTS

| Number | Name | Date |
| --- | --- | --- |
| 139,301 | Tower | Apr. 29, 1873 |
| 620,559 | Anderson | Mar. 7, 1899 |
| 1,041,199 | Tower | Oct. 15, 1912 |
| 1,103,284 | Guerne | July 14, 1914 |
| 2,498,888 | Hyland et al. | Feb. 28, 1950 |
| 2,511,642 | Law | June 13, 1950 |
| 2,551,870 | Bridger | May 8, 1951 |
| 2,570,142 | McKee | Oct. 2, 1951 |

FOREIGN PATENTS

| Number | Country | Date |
| --- | --- | --- |
| 549,114 | Great Britain | Nov. 6, 1942 |